United States Patent
Sakai et al.

(10) Patent No.: US 6,948,338 B2
(45) Date of Patent: Sep. 27, 2005

(54) VACUUM DEGASSING APPARATUS FOR MOLTEN GLASS

(75) Inventors: Mitsuyoshi Sakai, Chiba (JP); Michito Sasaki, Kanagawa (JP); Hajime Itoh, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 441 days.

(21) Appl. No.: 10/241,639

(22) Filed: Sep. 12, 2002

(65) Prior Publication Data

US 2003/0051509 A1 Mar. 20, 2003

(30) Foreign Application Priority Data

Sep. 14, 2001 (JP) ........................................ 2001-279168

(51) Int. Cl.⁷ .............................................. C03B 5/225
(52) U.S. Cl. .......................... 65/157; 65/134.2; 65/346; 266/210
(58) Field of Search ................... 75/511, 508; 266/210, 266/209; 65/157, 135.1, 134.2, 134, 346, 347

(56) References Cited

U.S. PATENT DOCUMENTS

| | | | | |
|---|---|---|---|---|
| 3,689,046 A | * | 9/1972 | Edouard De Bie et al. | 266/210 |
| 6,119,484 A | | 9/2000 | Takei et al. | |
| 6,202,445 B1 | * | 3/2001 | Sugimoto et al. | 65/134.2 |
| 6,332,339 B1 | * | 12/2001 | Kawaguchi et al. | 65/134.2 |
| 6,334,336 B1 | | 1/2002 | Takei et al. | |
| 6,405,564 B1 | | 6/2002 | Takei et al. | |
| 2002/0062664 A1 | * | 5/2002 | Schmitt et al. | 65/134.2 |

FOREIGN PATENT DOCUMENTS

| | | |
|---|---|---|
| EP | 0 759 524 | 2/1997 |
| EP | 1 002 769 | 5/2000 |
| JP | 11-130444 | 5/1999 |
| JP | 11-139834 | 5/1999 |
| JP | 11-240725 | 9/1999 |
| JP | 2000-7346 | 1/2000 |
| JP | 2000-159525 | 6/2000 |

* cited by examiner

Primary Examiner—Steven P. Griffin
Assistant Examiner—Lisa L. Herring
(74) Attorney, Agent, or Firm—Oblon, Spivak, McClelland, Maier & Neustadt, P.C.

(57) ABSTRACT

A vacuum degassing apparatus for molten glass includes a vacuum housing; a vacuum degassing vessel provided in the vacuum housing; an uprising pipe which connects to the vacuum degassing vessel; and a downfalling pipe which connects to the vacuum degassing vessel. The vacuum housing has an accommodating portion to accommodate the uprising pipe and an accommodating portion to accommodate the downfalling pipe, at least one of which is divided horizontally into a plurality of sections to form a plurality of divided rooms juxtaposed in the vertical direction, and the respective divided rooms are provided with a pressure controller to control the pressures of the respective divided rooms independently.

3 Claims, 3 Drawing Sheets

VACUUM DEGASSING APPARATUS FOR MOLTEN GLASS

The present invention relates to a vacuum degassing apparatus for molten glass, which removes bubbles from molten glass continuously supplied.

In order to improve the quality of formed glass products, there has been proposed a vacuum degassing apparatus which removes bubbles generated in molten glass before the molten glass that has been molten in a melting tank is formed by a forming apparatus.

The vacuum degassing apparatus 110 shown in FIG. 3 is used in a process wherein molten glass G in a melting vessel 120 is vacuum-degassed and is continuously supplied to a subsequent treatment vessel. The vacuum degassing apparatus 110 comprises a vacuum degassing vessel 114, and an uprising pipe 116 and a downfalling pipe 118 which are connected to respective end portions of the vacuum degassing vessel 114 in a downward and vertical direction. And the vacuum degassing vessel 114, the uprising pipe 116 and the downfalling pipe 118 are provided in a vacuum housing 112 which is evacuated to be depressurized therein.

The uprising pipe 116 has a lower end immersed in the molten glass G in an upstream pit 122 in communication with the melting vessel 120. Likewise, the downfalling pipe 118 has a lower end immersed in the molten glass G in a downstream pit 124 in communication with the subsequent treatment vessel (not shown).

The vacuum degassing vessel 114 is substantially horizontally provided in the vacuum housing 112 which is evacuated through a suction port 112C by a vacuum pump, not shown, to be depressurized therein. The inside of the vacuum degassing vessel 114 is depressurized, through suction ports 114A and 114B in communication with the inside of the vacuum housing 112, to a pressure of $\frac{1}{20}$ to $\frac{1}{3}$ atm., together with the inside of the vacuum housing 112.

Thus, the molten glass G in the upstream pit 122 before degassing is sucked and drawn up via the uprising pipe 116 by the principle of siphoning, and is introduced into the vacuum degassing vessel 114. The molten glass is vacuum-degassed in the vacuum degassing vessel 114 and then, it is drawn down via the downfalling pipe 118 and discharged into the downstream pit 124.

The vacuum housing 112 may be a casing made of metal, such as stainless steel or heat-resisting steel. In the vacuum degassing vessel 114 is formed an upper space 114s above the molten glass G which has been filled at a certain depth in the vacuum degassing vessel. Around the vacuum degassing vessel 114, the uprising pipe 116 and the downfalling pipe 118 in the vacuum housing 112 is provided thermal insulation material 130, such as refractory bricks, to cover these members for thermal insulation.

The vacuum degassing apparatus 110 is designed to treat the molten glass G having a high temperature, e.g. a temperature of 1,200 to 1,400° C., and there is a case where paths for molten glass in direct contact with the molten glass G, such as the vacuum degassing vessel 114, the uprising pipe 116 and the downfalling pipe 118, are constituted by circular shells, which are made of noble metal, such as platinum or a platinum alloy such as platinum rhodium.

However, since the above-mentioned known vacuum degassing apparatus 110 employed an expensive noble metal such as platinum or a platinum rhodium alloy, there was a disadvantage that in order to build the apparatus in a large size and to provide the apparatus with a large throughput, the wall thickness of the circular shells was obliged to be thin, whereby rupture of the shells and leakage of the molten glass into vacuum housing 12 were likely to occur.

On the other hand, there is a case where the paths for molten glass G in direct contact with the molten glass G are constituted by refractory bricks. However, even if denser refractory bricks are used as the refractory bricks to be used for these members, there will be problems such that the molten glass leaks through a gap at a joint to dissolve and erode backup refractory bricks or thermal insulation material behind the dense refractory bricks, whereby the brick components dissolved in the molten glass will degrade the quality of products. Further, particularly in the vacuum degassing apparatus 110, since the inside of the vacuum housing 112 is depressurized, leakage of the molten glass becomes remarkable and the backup refractory bricks or the thermal insulation material will be eroded by the molten glass, whereby the life of the vacuum degassing apparatus 110 itself will be shortened.

It is an object of the present invention to solve these problems, and to provide a vacuum degassing apparatus for molten glass capable of maintaining the pressure inside the vacuum housing and being useful for a long period of time by preventing or restraining molten glass from leaking through joints between refractory bricks in direct contact with the molten glass or by preventing backup refractory material or thermal insulation refractory material from being eroded.

In order to attain the object, the present invention comprises:

a vacuum housing which is evacuated to be depressurized therein;

a vacuum degassing vessel which is provided in the vacuum housing to vacuum-degas molten glass;

an uprising pipe which connects to the vacuum degassing vessel, and sucks and draws up undegassed molten glass to introduce the undegassed molten glass into the vacuum degassing vessel; and a downfalling pipe which connects to the vacuum degassing vessel and draws down the degassed molten glass from the vacuum degassing vessel to discharge the degassed molten glass;

wherein said vacuum housing has an accommodating portion to accommodate said uprising pipe and an accommodating portion to accommodate said downfalling pipe, at least one of which is divided horizontally into a plurality of sections, to form a plurality of divided rooms juxtaposed in the vertical direction, and the respective divided rooms are provided with pressure control means to control the pressures of the respective divided rooms independently.

The present invention comprises a vacuum degassing vessel, an uprising pipe, a downfalling pipe and a vacuum housing, wherein the vacuum housing is constructed so that its main body is divided at least at one portion so that the pressures in the respective divided rooms thereby formed can be controlled independently, whereby leakage of the molten glass is prevented and the above-mentioned problem is solved.

Particularly, it is preferred that for the uprising pipe and the downfalling pipe, the vacuum housing is divided horizontally into a plurality of sections, to form a plurality of divided rooms juxtaposed in the vertical direction, and the pressures of the divided rooms are increased (the vacuum degrees are decreased) to reduce the pressure difference between the pressures in the respective divided rooms and the liquid pressure of the molten glass, whereby the force for the molten glass to leak into the vacuum housing from the paths of the uprising and downfalling pipes, is suppressed.

Further, the liquid pressure of the molten glass in the uprising pipe and the downfalling pipe decreases from a lower position towards an upper position. Therefore, the pressures of the plurality of divided rooms are respectively controlled by the pressure control means so that they increase from the top section room towards the bottom section room in order to minimize the above-mentioned pressure difference.

Further, in order to maintain the principle of siphoning, the pressure in each of the divided rooms is preferably controlled by the pressure control means to satisfy 0.5 (atm)≧GPi–HPi≧0 (atm), where GPi is the minimum liquid pressure of the molten glass in the divided room, and HPi is the pressure in the divided room.

IN THE ACCOMPANYING DRAWINGS

Figure 1:
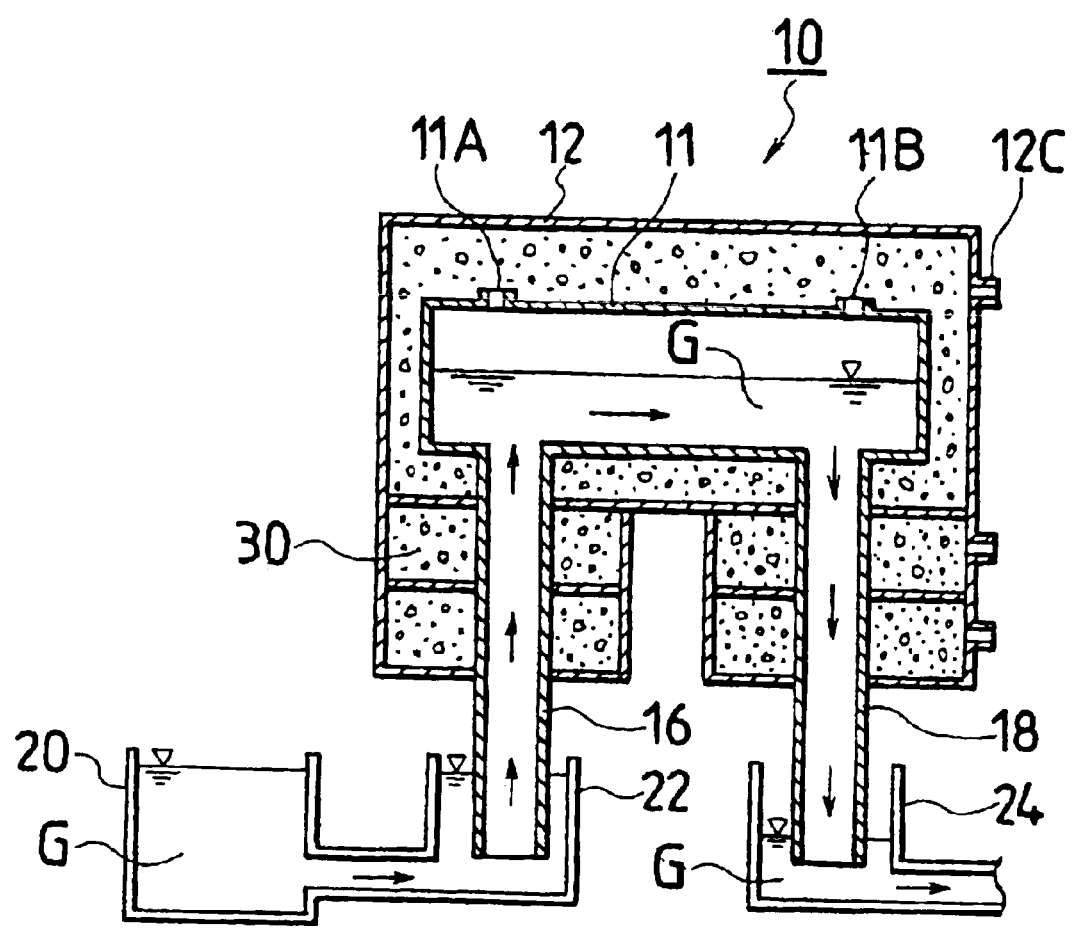
FIG. 1 is a schematic cross-sectional view illustrating an embodiment of the vacuum degassing apparatus according to the present invention.

Here, reference numeral 110 indicates a vacuum degassing apparatus, 114 a vacuum degassing vessel, 112 a vacuum housing, 112C a suction port, 116 an uprising pipe, 118 a donwfalling pipe, 120 a melting vessel, 122 an upstream pit, 124 a downstream pit and 130 a heat-insulating material.

Now, the vacuum degassing apparatus for molten glass according to the present invention will be described in detail with reference to a preferred embodiment shown in the accompanying drawings.

The vacuum degassing apparatus 10 for molten glass in the embodiment as shown in FIG. 1, comprises a vacuum housing 12 of a substantially rectangular arched shape made of stainless steel, a vacuum degassing vessel 11 horizontally housed in the vacuum housing 12 and having a rectangular sectional shape, and an uprising pipe 16 and a downfalling pipe 18 vertically housed in the vacuum housing 12 and having respective upper ends connected to right and left end portions of the vacuum degassing vessel 11.

The vacuum degassing apparatus 10 is used in a process wherein molten glass G in a melting vessel 20 is vacuum-degassed and the degassed molten glass is continuously supplied to a subsequent treatment vessel, not shown, such as a forming treatment vessel for plate material like a floating bath, or a forming treatment vessel for bottles.

The uprising pipe 16 has a lower end immersed in the molten glass G in an upstream pit 22 in communication with the melting vessel 20, and the downfalling pipe 18 has a lower end immersed in the molten glass G in a downstream pit 24 in communication with the subsequent treatment vessel.

The vacuum degassing vessel 11 is depressurized through suction ports 11A and 11B in communication with the vacuum housing 12, together with the vacuum housing 12 which is evacuated by a vacuum pump, not shown, through a suction port 12C, so as to depressurize the inside, whereby the inside of the vacuum vessel 11 is depressurized to a desired pressure.

Thus, the molten glass G in the upstream pit 22 before degassing is sucked and drawn up via the uprising pipe 16 by the principle of siphoning, and is introduced into the vacuum degassing vessel 11. After the molten glass has been vacuum-degassed in the vacuum degassing vessel 11, the molten glass is drawn down via the downfalling pipe 18 and discharged into the downstream pit 24.

The vacuum housing 12 is formed in a gate-like-shape, and works as a casing (pressure vessel) to maintain airtightness when depressurizing the vacuum degassing vessel 11. In this embodiment, the vacuum housing is divided into five sections and is constituted so that it encloses entirely the vacuum degassing vessel 11, the uprising pipe 16 and the downfalling pipe 18. However, the number of division of the vacuum housing 12 is not limited to be five.

It is preferred to use a dense electro-cast refractory material for the vacuum degassing vessel 11, the uprising pipe 16 and the downfalling pipe 18 of the present invention. Namely, the essential part of the vacuum degassing apparatus 10, which is directly in contact with the molten glass, is formed by assembling electro-cast refractory bricks being dense electro-cast material, whereby not only a large capacity of the vacuum degassing apparatus is realized, but also vacuum degassing treatment at a higher temperature becomes possible.

The electro-cast refractory bricks are not particularly restricted so long as they are molded into a prescribed shape by casting after the raw refractory material is melted by an electric melting process. Various types of conventional electro-cast refractory bricks may be used. Among them, alumina ($Al_2O_3$) type electro-cast refractory bricks, zirconia ($ZrO_2$) type electro-cast refractory bricks and alumina-zirconia-silica ($Al_2O_3$—$ZrO_2$—$SiO_2$) type electro-cast refractory bricks may be mentioned as preferred examples. Particularly, it is preferred to use MARSNITE (MB) when the temperature of molten glass G is at most 1,300° C., and to use ZB-X950 or ZIRCONITE (ZB) when it is more than 1,300° C. (all manufactured by Asahi Glass Company, Limited).

Although a dense electro-cast refractory material is used in this embodiment, the material is not limited thereto, and a dense burned refractory material may also be used.

Dense burned refractory bricks to be used as the dense burned refractory material, are preferably dense alumina type refractory bricks, dense zirconia-silica type refractory bricks or dense alumina-zirconia-silica type refractory bricks.

Further, the vacuum housing 12 comprises thermal insulation material 30 which insulates high temperatures from the molten glass G and which has an air-permeable property to provide no bar to evacuation in the vacuum degassing vessel 11, at regions outside the vacuum degassing vessel 14, the uprising pipe 16 and the downfalling pipe 18.

There is no particular limitation as to the material and the structure of the vacuum housing 12 as long as the vacuum housing has sufficient airtightness and strength required for the vacuum degassing vessel 11. The vacuum housing is preferably made of metal, in particular stainless steel or heat-resisting steel.

Figure 2:
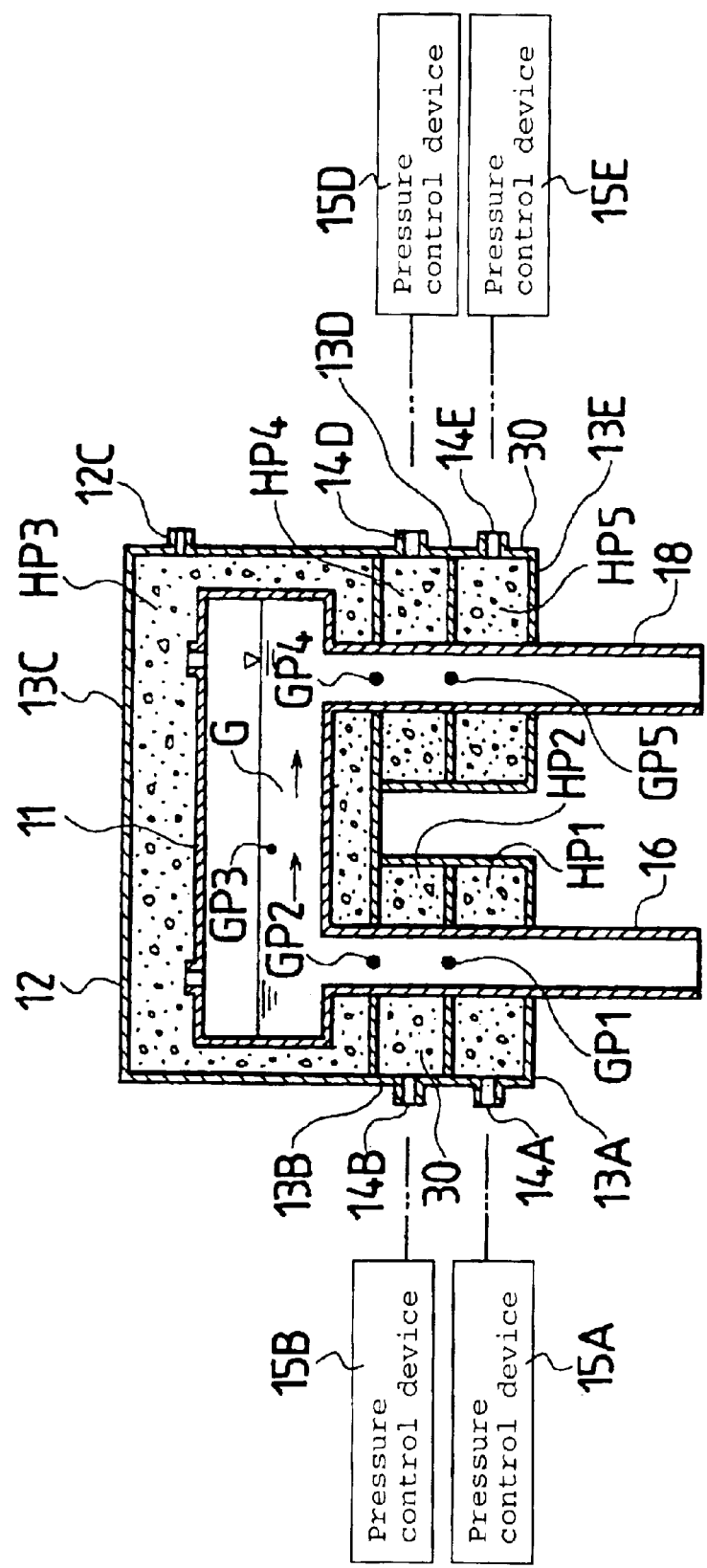
FIG. 2 is a view illustrating the pressure control of each of the divided rooms in the vacuum degassing apparatus shown in FIG. 1.

The vacuum housing 12 is divided into five divided rooms 13A, 13B, 13C, 13D and 13E, as shown in FIG. 2. Among these divided rooms 13A to 13E, divided rooms 13A and 13B are rooms for accommodating the uprising pipe 16, formed by dividing a conventional single room horizontally into two sections juxtaposed in the vertical direction. The divided rooms 13A to 13E are respectively sealed by walls, and divided rooms 13A and 13B have suction ports 14A and 14B, respectively. The suction ports 14A and 14B are provided with pressure control devices (pressure control means) 15A and 15B, respectively, so that the pressures in the divided rooms 13A and 13B can be controlled independently. Each pressure control device comprises, for example, a vacuum pump and a regulator. Here, the number of division of the vacuum housing 12 at the accommodating portion for the uprising pipe is not limited to be two.

The divided room 13C is a room accommodating the vacuum degassing vessel 11, and a vacuum pump, not shown, is connected to a suction port 12C.

The divided rooms 13D and 13E are rooms for accommodating the downfalling pipe 18, formed by dividing a conventional single room horizontally into two sections juxtaposed in the vertical direction. The divided rooms 13D and 13E have suction ports 14D and 14E, respectively, and the suction ports 14D and 14E are provided with pressure control devices (pressure control means) 15D and 15E, respectively, so that the pressures in the divided rooms 13D and 13E can be controlled independently. Each pressure control device comprises, for example, a vacuum pump and a regulator. Here, the number of division of the vacuum housing 12 at the accommodating portion for the downfalling pipe, is not limited to be two. Further, in this embodiment, the vacuum housing is divided at both accommodating portions for the uprising and downfalling pipes, but the vacuum housing may be divided at at least one of them.

These divided rooms 13A to 13E are respectively evacuated by a vacuum pump, so that the insides of the divided rooms 13A to 13E are depressurized and set to have pressures of HP1, HP2, HP3, HP4 and HP5, respectively. The pressure HP3 inside the vacuum degassing vessel 11 provided at the central portion, is set to have a pressure necessary for removing bubbles from the interior of the molten glass, for example, at a level of from 1/20 to 1/3 atm.

By the way, the liquid pressure of the molten glass in the uprising pipe 16 and in the downfalling pipe 18 in the vacuum degassing apparatus 10, decreases from the lower position towards the upper position, according to the principle of siphoning. Therefore, in order to reduce the pressure difference between a divided room and the molten glass present in the divided room at an optional position of the uprising pipe 16 or the downfalling pipe 18, it is preferred to control the pressures in the divided rooms 13A, 13B, 13D and 13E, so that they increase from the top section room towards the bottom section room, by means of the pressure control devices 15A, 15B, 15D and 15E.

One example will be given. For example, when the minimum liquid pressures GP1 and GP5 of the molten glass in the uprising and downfalling pipes 16 and 18, respectively, corresponding to the divided rooms 13A and 13E, are 0.8 atm, the minimum liquid pressures GP2 and GP4 of the molten glass in the uprising and downfalling pipes 16 and 18, respectively, corresponding to the divided rooms 13B and 13D, are 0.4 atm, and the minimum liquid pressure GP3 of the molten glass in the vacuum degassing vessel 11, is 0.1 atm, then, the pressure HP1 in the divided rooms 13A and 13E is set to be 0.5 atm, and the pressure HP2 in the divided rooms 13B and 13D is set to be 0.2 atm.

Here, assuming that P is the difference between the pressure in a divided room and the minimum liquid pressure of the molten glass in the divided room, and P1 is P in the divided rooms 13A and 13E, $P1=0.8-0.5=0.3$ atm.

Figure 3:
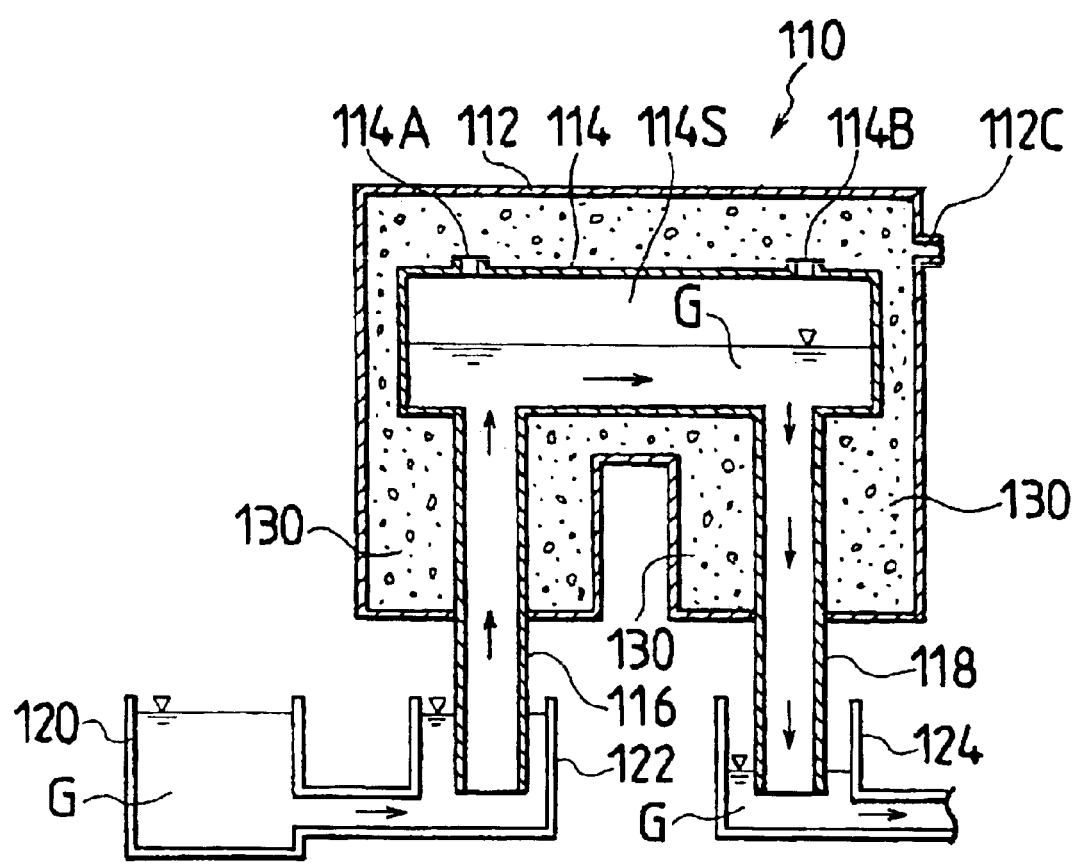
FIG. 3 is a schematic cross-sectional view of a conventional vacuum degassing apparatus for molten glass.

On the other hand, assuming that P1' is the above-mentioned pressure difference P in the conventional vacuum degassing apparatus 110 (see FIG. 3) having no divided room, $P1'=0.8-0.1=0.7$ atm.

Therefore, by the vacuum degassing apparatus 10 of this embodiment, the above-mentioned pressure difference P1 in the divided rooms 13A and 13E, can be reduced from 0.7 atm to 0.3 atm, whereby it is possible to reduce the force for the molten glass G to leak from the paths in the uprising and downfalling pipes 16 and 18 into the divided rooms 13A and 13E.

Thus, it is possible to provide a vacuum degassing apparatus 10 for molten glass having sufficient durability against high temperature molten glass G and being excellent in the safety.

Further, the pressure difference P2 of the divided rooms 13B and 13D against the divided room 13C, is $P2=0.4-0.2=0.2$ atm, While in the conventional vacuum degassing apparatus, $P2'=0.4-0.1=0.3$ atm. Therefore, the force for the molten glass G to leak from the paths in the uprising and downfalling pipes 16 and 18 into the divided rooms 13B and 13D, can be reduced in the same manner also in this case.

Meanwhile, when the minimum liquid pressure of the molten glass in a divided room is GPi, and the pressure in the divided room is HPi, if GPi−HPi is 0, the pressure of the molten glass G and the inner pressure of the housing are balanced and flow of the glass is not likely to occur. When GPi−HPi becomes negative, the pressure of the molten glass G is lower than in the housing, whereby a problem is likely to occur such that a substance containing foreign matters from the bricks enters into the glass. Therefore, GPi−HPi is preferably 0 or a positive, and in order to prevent leakage of the molten glass, it is preferably at most 0.5 atm, more preferably at most 0.3 atm.

The vacuum degassing apparatus for molten glass of the present invention, can also be applied to a case where the paths for molten glass, which are directly in contact with the molten glass G, are made of a noble metal such as platinum or a platinum alloy such as platinum-rhodium.

As described above in detail, according to the vacuum degassing apparatus of the present invention, along the uprising and downfalling pipes where the liquid pressure of the molten glass is high, the vacuum housing is divided into a plurality of sections in the vertical direction to form a plurality of divided rooms, and the pressures of the respective rooms are raised so that the pressure differences from the liquid pressure of the molten glass are reduced, whereby the force for the molten glass to leak from the paths in the uprising and downfalling pipes into the vacuum housing is suppressed. Accordingly, it is thereby possible to present a vacuum degassing apparatus for molten glass to remove bubbles from molten glass continuously supplied, wherein the vacuum degassing apparatus has sufficient durability against the high temperature molten glass and is excellent in the safety. Particularly, when the uprising and downfalling pipes are made of refractory bricks, shortening of lifetime caused by leakage of the molten glass can be prevented.

Further, according to the present invention, the pressures in a plurality of divided rooms are controlled by pressure control means, so that they increase from the top section room towards the bottom section room, and the difference between the pressure in each of the divided rooms and the liquid pressure of the molten glass can be thereby minimized, and the force for the molten glass to leak can be thereby further suppressed.

The entire disclosure of Japanese Patent Application No. 2001-279168 filed on Sep. 14, 2001 including specification, claims, drawings and summary are incorporated herein by reference in its entirety.

What is claimed is:

1. A vacuum degassing apparatus for molten glass, comprising:
    a vacuum housing which is evacuated to be depressurized therein;
    a vacuum degassing vessel which is provided in the vacuum housing to vacuum-degas molten glass;
    an uprising pipe which connects to the vacuum degassing vessel, and sucks and draws up undegassed molten glass to introduce the undegassed molten glass into the vacuum degassing vessel; and
    a downfalling pipe which connects to the vacuum degassing vessel and draws down the degassed molten glass from the vacuum degassing vessel to discharge degassed molten glass;
    wherein said vacuum housing has an accommodating portion to accommodate said uprising pipe and an accommodating portion to accommodate said downfalling pipe, at least one of which is divided horizontally into a plurality of sections, to form a plurality of divided rooms juxtaposed in the vertical direction, and the respective divided rooms are provided with pressure control means to control the pressures of the respective divided rooms independently.

2. The vacuum degassing apparatus according to claim 1, wherein the pressures of the plurality of divided rooms are respectively controlled by the pressure control means so that they increase from the top section room towards the bottom section room.

3. The apparatus according to claim 1 or 2, wherein the pressure in each of the divided rooms is controlled by the pressure control means to satisfy $0.5(atm) \geqq GPi-HPi \geqq 0$ (atm), where $GPi$ is the minimum liquid pressure of the molten glass in the divided room, and $HPi$ is the pressure in the divided room.

* * * * *